DIGITAL TRANSMISSION SYSTEM

Filed Jan. 13, 1967

INVENTORS
MURRAY H. BOLT
HOWARD H. NICK

BY

Douglas R. McKechnie

ATTORNEY

United States Patent Office 3,516,065
Patented June 2, 1970

3,516,065

DIGITAL TRANSMISSION SYSTEM

Murray H. Bolt, Poughkeepsie, and Howard H. Nick, Wappingers Falls, N.Y., assignors to International Business Machines Corporation, Armonk, N.Y., a corporation of New York Filed Jan. 13, 1967, Ser. No. 609,083
Int. Cl. H04q *5/00*
U.S. Cl. 340—170 8 Claims

ABSTRACT OF THE DISCLOSURE

Data processing devices, such as memory units, channels, central processing units, etc., are interconnected by a transmission system for the transfer of information between such devices. Each information or data path has a transmission line connected to a plurality of strip line directional couplers each of which has an impedance match with the transmission line independent of any stub line length. One or more drivers and one or more receivers, each housed in one of the devices, are connected to the transmission line and to the couplers, the connection to the couplers being through stub lines. The directional couplers may be connected so as to be responsive to pulses propagating in only one direction or in both directions along the lines.

This invention relates to systems for transmitting digital data between a plurality of data processing devices and, more particularly, to systems using strip line directional couplers.

In the prior art, it is common to interconnect the various data processing devices of a data processing system, such as channels, central processing units, memories, etc., by means of a transmission system comprising a transmission line and stubs. The line is serially passed through the various devices and the stubs, connected by a T connector to the line, electrically couple the internal circuits of each device with the line. While such systems are highly successful and satisfactory, they nevertheless have certain characteristics which the present invention is designed to improve. One such characteristic is due to the high rates and speeds of data transfer. The circuits commonly used for high speed data transfer are actuated by "square" waves. These waves are not truly square but have a "ramp" at both ends, the ramps being said to have fast or slow rise or fall times. When transferring data at high rates, the ramps have to have fast rise and fall times and to provide such fast times with the above stub connections requires that the stubs be short. A common stub length is in the order of six inches. One reason for such a stub length limitation is that since the transfer of information is done at a high speed relative to the transmission line or cable length, any reflection caused by a discontinuity on the line degrades the drive wave forms. To prevent this, all receivers have to be placed near the main line or bus and each receiver requires a high input impedance so as to produce a near perfect transmission line with minimum reflection at each receiver stub.

The short stub and short length of cable relative to the speed of data transfer imposes additional packaging and configuration limitations. First, the stubs are packaged within the housing of the individual devices and this requires that the transmission line be passed through the device so as to have two connections thereto, an input from the preceding device and an output to the next device, if any. Second, since the pulses would arrive at the devices at different times, quite often the physical layout of the system is fixed and variations in it are inhibited due to any critical times of data transfer between the devices. Access time, defined as the time required to fetch data from memory, can vary considerably from one isolated memory unit to another due to the propagation time through the cables tying the memories and CPU together.

Accordingly, one of the objects of the invention is to provide a data processing device transmission system that improves upon the above-mentioned characteristics of the above-described prior art systems.

Another object of the invention is to provide a high speed digital data transmission system that eliminates any stub length limitation and allows any stubs or stub lines connecting the individual devices to the transmission line to be limited only by the degradation of a signal passed along the line.

Another object is to provide a transmission system not having any stub length limitation so that the stub lines can be of variable length to provide flexibility in the system configuration.

Another object of the invention is to provide a transmission system interconnecting a plurality of data processing devices where the system configuration can be such that the signals emanating from one device arrive at all the other devices at approximately the same time.

Still another object of the invention is to provide a data processing system having only one input from a transmission line into the data processing device connected thereto.

As is known, a strip line directional coupler is a device wherein two parallel adjacent printed circuit strip lines sandwiched between two ground planes are inductively and capacitively coupled so that the edges of a first pulse, of fast rise and fall time characteristics, propagating along one line, produce a positive pulse and a negative pulse in the other line. The lines are back coupled or directional in that the thus produced pulses propagate along the second line in a direction opposite to the direction in which the first pulse propagates along the first line. While such strip line couplers have been heretofore proposed for use in data processing systems, such as, for example, for serial to parallel code conversion, they have not been adapted, to our knowledge, to a transmission system for transmitting digital data between the various units of a data processing system that are separately housed. Thus, another object of the invention is to provide a digital transmitting system having a plurality of strip line couplers for transferring information between a transmission line and a plurality of data procesing devices.

A further object of the invention is to provide a digital data transmission system employing strip line couplers wherein the pulses induced through the couplings are used to actuate a device so as to produce a pulse that follows or duplicates the pulse that induced the pulses through the coupling.

Still another object of the invention is to provide a strip line coupler arrangement that is responsive to signals travelling in either direction along a transmission line coupled thereto.

Briefly stated, in one embodiment of the invention, a transmission line is provided having a characteristic impedance and this line is connected, for example, to a driver in one of the data processing devices in the system. At each of the other devices in the system, the transmission line is connected through a directional strip line coupler to a receiver, for example. The strip line couplers are designed so that their impedance matches that of the line to minimize any reflections in the system due to differences in impedances. The impedance due to each strip line coupler is not dependent in any critical manner upon the length of stub between the actual coupling and the receiver so that the problem due to any stub length limitation is thereby avoided. The driver produces two types of pulses that propagate along the transmission line and through each of the couplers. One type of driver pulse induces both positive and negative pulses that are fed to the receivers coupled thereto. Each receiver comprises a latch that is turned on and turned off by the positive and negative pulses, respectively, for example, so as to produce an output that follows the pulse propagated along the transmission line. The second type of driver pulse merely turns the latch on or off, dependent upon which edge of the pulse is operative, and thereby provides a controlling response.

In another embodiment of the invention, two drivers are arranged to propagate pulses along a transmission line in opposite directions and a single receiver is coupled by directional strip line couplers so as to be responsive to pulses travelling along the line in either direction. Such a system may be further combined with additional receivers and directional couplers that are responsive to pulses travelling in one direction only.

The foregoing and other objects, features and advantages of the invention will be apparent from the following more particular description of preferred embodiments of the invention, as illustrated in the accompanying drawing.

Figure 1:
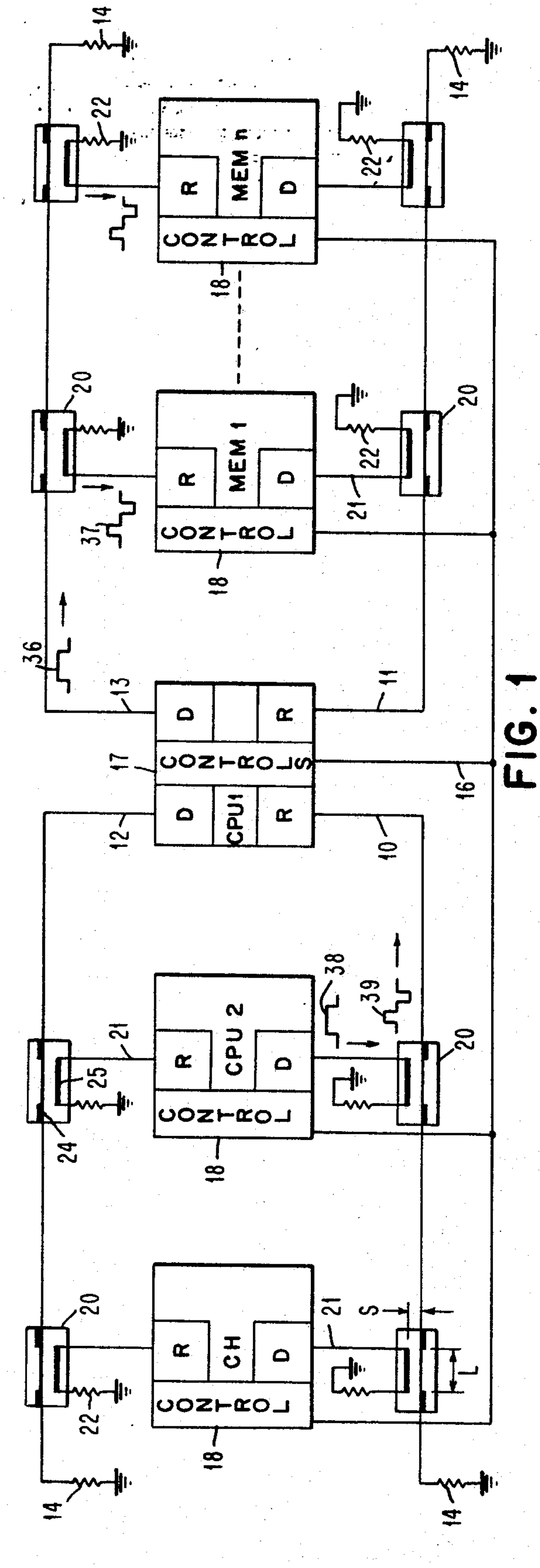
FIG. 1 is a schematic diagram of an exemplary data processing system embodying the invention.

Referring now to the drawing, the invention has been illustrated as embodied in a data processing system comprising a CPU (central processing unit) 1, a CPU 2, a channel CH and a plurality of memory units MEM 1–MEM *n*, connected by a transmission system comprising transmission lines 10–13 each of which terminates in a terminating resistor 14 providing a characteristic impedance to each line. Relative to the transmission system, CPU 1 acts as a controlling device and the remaining data processing devices act as controlled devices for the transmission of data. To accomplish this, a control line 16 connects a control section 17 of CPU 1 to control units 18 of the controlled devices and the controls section 17 is effective to generate signals for controlling which devices are to generate the data that is to be transmitted and which devices are to utilize the data thus transmitted. While in the illustrated system, CPU 1 is the controlling device, it is to be understood that in an actual data processing system a plurality of transmission systems may be provided in which the other devices may also act as a controlling device relative to each system. It is to be also understood that while each of the transmission lines 10–13 is a single transmission line for transmitting serial data, each line could also be used in conjunction with similarly arranged parallel lines for transmitting parallel data or a combination of parallel and serial mode.

CPU 1 comprises two receivers R that are AC coupled to lines 10 and 11, and two drivers D that are AC coupled to lines 12 and 13. A plurality of strip line directional couplers 20 are connected to the transmission lines, as shown, the couplers being also connected to stub lines 21 and terminating resistors 22 that aid in matching the impedance of couplers 20 to that of the transmission line. The other end of stub lines 21 are connected to receivers R and drivers D of the controlled devices, as shown.

Each of couplers 20 is of conventional construction and includes a first section 24 that is connected at its ends to the transmission line and a second section 25 that is connected at its ends to a stub or stub line 21 and a resistor 22. The width of each section 24 is reduced slightly, in a known manner, to aid impedance matching. Sections 24 and 25 are parallel to each other throughout a length L which establishes the width W2 or duration of the pulse, shown in FIG. 3, produced by the coupling action in dependence upon the propagation time of a pulse travelling along either section, the sections being separated by a distance S throughout the parallel section which establishes the coupling ratio for each coupler. As is known, a strip line coupler is operated by the edge of the wave passing along one of the lines and this wave edge should have a rise or fall time that is twice as fast as the time duration of the pulse induced in the coupling in order that the relationship of the height of the induced pulse be related to the height of the driving pulse in the manner defined by the coupling ratio. However, as will be later described, advantage is also taken of the fact that where the edge of the driver pulse is slow and does not induce a pluse through the coupling of any appreciable amount, this can also be used to effect a controlling action in the receiver.

Each receiver R is in the form of an electronic latch where a positive going or postive pulse from the coupler is effective to switch the output of the latch from a negative to a positive voltage level and a negative going or negative pulse from the coupler is effective to switch the output of the latch from the positive level to a negative level. Each latch also has the usual threshold level which is chosen so as to be above the level of any pulses produced by the inoperative pulse edges described below.

Figure 3:
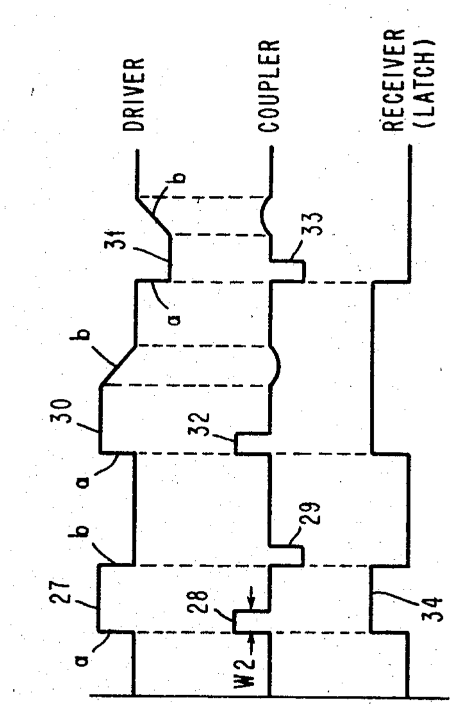
FIG. 3 is a pulse timing diagram facilitating an understanding of certain aspects of the invention.

Each driver D is effective as previously indicated, to selectively produce pulses of two types. With reference to FIG. 3, the first type of pulse 27 has a leading or front edge *a* and a rear edge *b* that are both operative to induce positive and negative pulses 28 and 29 through the coupler. The second type of pulse produced by the driver is indicated at 30 and 31, and such types have operative edges that are effective to produce pulses 32 and 33, respectively, through the coupler. Pulses 30 and 31 also have inoperative edges *b* whose rate of change is too slow to produce an effective pulse through the coupler. Thus, assuming the latch to be negative, when a series of pulses 30 and 31 are passed through the coupler, the first induced pulse 32 is effective to shift the output of the latch to a positive level and the output remains at this level until the operative edge *a* of pulse 31 produces the negative pulse 33 that switches the latch from the positive to the negative level. Thus, the type of pulses represented by 27 are effective to produce at the output of the associated latch a pulse 34 that follows or duplicates at least the width of the driver pulse 27 whereas pulses of the type such as 30 and 31 may be used for control function to turn the latch on and off for variable periods of time.

Each coupler 20 is properly oriented so that the driving or driver pulses and coupler pulses are propagated in the correct direction for operation of the system. As an example, when driver D in CPU 1 induces a pulse along transmission line 13, the pulse 36 propagates to the right along line 13 and passes through the first sections of couplers 20 associated therewith. In each coupler that the pulse 36 passes through, the induced pulse 37 propagates along the second section in a backward direction, that is from left to right, and therefore the stub line associated therewith is connected to the left end of the second section and the resistor 22 is connected to the right end. Similarly, a pulse 38 produced by driver D of CPU 2 would travel through the stub line and connected second section of coupler 20 in a direction from right to left to thereby induce in transmission line 10, pulses 39 that move or propagate from left to right along line 10, and to receiver R connected thereto.

The system thus far disclosed has several advantages. First, because the impedance of couplers 20 matches that of the transmission line connected thereto and such matching is independent of the stub length, there is no stub length limitation on the system and thus the various devices can be located at different distances from the transmission line. Thus, by packaging couplers 20 as separate and distinct units from the packing of the devices, there need be only one input from the transmission line into each device for each receiver or driver, such input being merely the stub line 21 connected thereto. Moreover, while there is a limitation on the total length that pulses must travel due to the degradation of the pulses due to resistances of the lines that they traverse, and due to the transfer of a certain amount of the energy of, for example, pulse 36, into the coupler pulses 37 produced thereby, the various devices connected to the line can be proportioned so that the pulses received at each device can arrive simultaneously. This can be done by making those stub lines connected to the couplers nearest to the driver longer than those for devices connected to stub lines and couplers that are more remote from the drivers. Furthermore, to increase the total length of the system, those couplers that are nearest to the drivers or those drivers nearest to the receivers can have different coupling ratios, so that the amount of energy transferred therethrough is sufficient to operate the receivers without requiring that the energy derived from the pulses be greatly degraded.

Another advantage of the system relates to the improved noise suppression characteristics. For example, with reference to transmission line 13, any spurious signals that are induced in line 13 and which travel from right to left will by virtue of the back coupling effect, be dissipated in resistor 22 of couplers 20. Any noise signals travelling in the other direction will be reduced by the attenuation characteristics of each coupler. Spurious signals such as might be caused by a loss of power in any one of the devices, will be attenuated by the coupler 20 so that the induced pulses will either be terminated in resistor 14 or propagate in such a direction as to not be back coupled into any couplers upline thereof.

Figure 2:
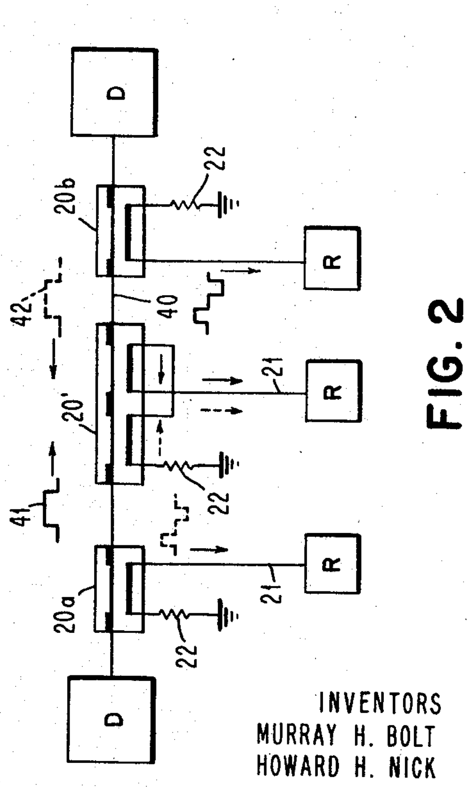
FIG. 2 is a schematic diagram of a modified form of the invention.

In FIG. 2, drivers D are connected at opposite ends of a transmission line 40 so as to produce pulses 41 and 42 that propagate in opposite directions along the lines. The impedances of drivers D are chosen to provide the transmission line characteristic impedance that is matched to the impedances of couplers 20*a*, 20*b* and 20′ connected thereto. Coupler 20*a* is oriented so as to be responsive to pulses 42, whereas coupler 20*b* is oriented to be responsive to pulses 41. Coupler 20′ is in effect two single couplers in which the first sections connected to the transmission line 40 provide a straight through path and in which the second sections connected to resistor 22 and stub line 21 are oriented so that one is responsive to pulses 42 and the other is responsive to pulses 41, whereby the receiver connected thereto will receive pulses due to the driver pulses being propagated along line 40 in either direction.

What is claimed is:

1. For a digital data processing system having a plurality of data processing devices between which data is to be transmitted, each of said devices having control means for selectively enabling the devices between which digital data is to be transmitted, a transmission system comprising:

at least one driver in one of said devices for generating first pulses manifesting information to be transmitted;

at least one receiver in another one of said devices;

a transmission line extending between said devices;

a strip line directional coupler operatively coupled to said transmission line;

a stub line connected to said coupler;

said driver being connected to a selected one of said stub line and said transmission line so as to propagate said first pulses therealong;

said receiver being connected to the other of said stub line and said transmission line for receiving second pulses propagated thereto;

and said coupler being connected relative to the direction of propagation of said first pulses to generate said second pulses for progagation along the line connected to said receiver.

2. The combination of claim 1 wherein said driver is coupled to said transmission line and said system further includes a plurality of additional receivers, couplers and stub lines arranged similarly to said first mentioned receiver, stub line and coupler, whereby first pulses generated by said driver are propagated along said transmission line so as to produce through said couplers said second pulses that are received by said receivers.

3. The combination of claim 1 wherein said receiver is coupled to said transmission line and said system further includes a plurality of drivers, couplers and stub lines arranged similar to said first mentioned driver and stub line and coupler connected thereto, whereby said drivers are operative to generate said first pulses which through said associated couplers induce said second pulses that are propagated to said receiver.

4. The combination of claim 1 wherein said receiver comprises a latch switchable between states in response to said second pulses received thereby from said coupler.

5. The combination of claim 4 where said driver is operative to produce first pulses having front and rear operative edges whereby the output of said latch follows said driving pulse.

6. The combination of claim 4 wherein said driver is operative to selectively produce pulses having one operative edge and one inoperative edge whereby the state of said latch is selectively changed by said driver generating pulses of appropriate characteristics.

7. The combination of claim 1 wherein said transmission line and said coupler are packaged externally to said devices whereby the length of said stub line is independent of the impedance of said coupler so as to allow said device to be placed at a distance from said coupler.

8. The combination of claim 1 wherein said coupler comprises a straight first section connected to said transmission line and two second sections, one of said second sections being connected to said stub line, an end of the other said second section being connected to a matching resistor and the remaining ends being connected to each other so that said coupler is operable to produce said second pulses in response to said first pulses, having operative front edges, travelling or propagating in either direction along said transmission line.

References Cited

UNITED STATES PATENTS

| | | | |
|---|---|---|---|
| 3,086,178 | 4/1963 | Boyd | 333—6 |
| 3,428,918 | 2/1969 | Matthaei | 333—6 |

THOMAS A. ROBINSON, Primary Examiner

U.S. Cl. X.R.

333—10; 340—147